United States Patent
Wu et al.

(10) Patent No.: US 9,726,780 B2
(45) Date of Patent: Aug. 8, 2017

(54) RESISTIVITY LOGGING TOOLS WITH TILTED FERRITE ELEMENTS FOR AZIMUTHAL SENSITIVITY

(71) Applicant: HALLIBURTON ENERGY SERVICES, INC., Houston, TX (US)

(72) Inventors: Hsu-Hsiang Wu, Sugar Land, TX (US); Randy Beste, Katy, TX (US); Jesse K. Hensarling, Cleveland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 14/891,000

(22) PCT Filed: Nov. 13, 2014

(86) PCT No.: PCT/US2014/065443
§ 371 (c)(1),
(2) Date: Nov. 13, 2015

(87) PCT Pub. No.: WO2016/076872
PCT Pub. Date: May 19, 2016

(65) Prior Publication Data
US 2016/0274264 A1    Sep. 22, 2016

(51) Int. Cl.
*G01V 3/28*    (2006.01)
*E21B 47/12*    (2012.01)

(52) U.S. Cl.
CPC .............. *G01V 3/28* (2013.01); *E21B 47/12* (2013.01)

(58) Field of Classification Search
CPC .............. G01V 3/18; G01V 3/26; G01V 3/28
See application file for complete search history.

(56) References Cited

U.S. PATENT DOCUMENTS

| | | | |
|---|---|---|---|
| 6,577,129 B1* | 6/2003 | Thompson | G01V 3/30 324/338 |
| 2004/0196047 A1 | 10/2004 | Fanini et al. | |
| 2009/0302847 A1 | 12/2009 | Knizhnik | |
| 2010/0244841 A1 | 9/2010 | Wang | |
| 2012/0249149 A1 | 10/2012 | Bittar et al. | |
| 2014/0292340 A1* | 10/2014 | Yang | G01V 3/28 324/338 |

FOREIGN PATENT DOCUMENTS

| WO | 2008008386 A2 | 1/2008 |
| WO | 2008036557 A2 | 3/2008 |
| WO | 2011129828 A1 | 10/2011 |

OTHER PUBLICATIONS

International Search Report and Written Opinion issued in related PCT Application No. PCT/US2014/065443, mailed on Mar. 13, 2015 (18 pages).

* cited by examiner

*Primary Examiner* — Clayton E Laballe
*Assistant Examiner* — Noam Reisner
(74) *Attorney, Agent, or Firm* — Benjamin Fite; Baker Botts L.L.P.

(57) ABSTRACT

An example logging tool includes a tool body characterized by a longitudinal axis and an antenna coupled to the tool body. The logging tool further includes a ferrite element coupled to the tool body proximate at least a portion of the antenna and in a non-parallel orientation with respect to a normal of a plane defined by the antenna.

20 Claims, 5 Drawing Sheets

RESISTIVITY LOGGING TOOLS WITH TILTED FERRITE ELEMENTS FOR AZIMUTHAL SENSITIVITY

CROSS-REFERENCE TO RELATED APPLICATION

The present application is a U.S. National Stage Application of International Application No. PCT/US2014/065443 filed Nov. 13, 2014, which is incorporated herein by reference in its entirety for all purposes.

BACKGROUND

The present disclosure relates generally to well drilling operations and, more particularly, to resistivity logging tools with tilted ferrite elements for azimuthal sensitivity.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Measurements of the subterranean formation may be made throughout the operations using downhole measurement and logging tools to characterize the formation and aide in making operational decisions. One example logging tool may make measurements used to determine the electrical resistivity (or its inverse conductivity) of the formation, the determined electrical resistivity indicating features of the formation. Those measurements may be taken using antennas coupled to the logging tool. In certain instances, tilted antennas may be used to provide azimuthally sensitive measurements that can be focused in desired areas of the formation. The amount the antenna is tilted with respect to a logging tool increases the azimuthal sensitivity of the antenna but also the axial space on the logging tool necessary to accommodate the antenna, which may limit how and where the antenna can be used.

FIGURES

Some specific exemplary embodiments of the disclosure may be understood by referring, in part, to the following description and the accompanying drawings.

Figure 1:
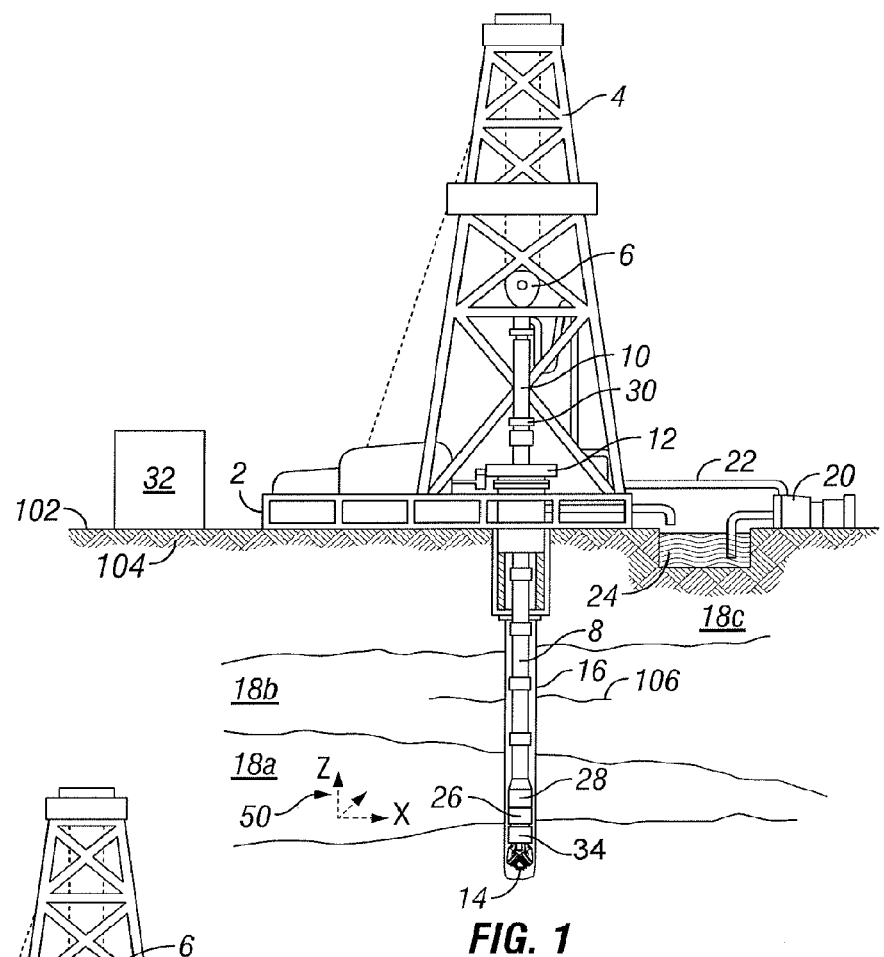
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

According to aspects of the present disclosure, a resistivity logging tool with an antenna and at least one ferrite element proximate and tilted with respect to the antenna can be used to provide azimuthally sensitive measurements. As will be described in detail below, the tilted ferrite element may alter the EM field distribution around the antenna to effectively provide a tilted antenna, or an antenna with a greater degree of tilt, without a corresponding increase in the axial space occupied by the antenna.

FIG. 1 is a diagram of a subterranean drilling system 100 incorporating an example resistivity logging tool 26, according to aspects of the present disclosure. The drilling system 100 comprises a drilling platform 2 positioned at the surface 102. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a bottom hole assembly (BHA) coupled to the drill string 8 near the drill bit 14. The BHA may comprise various downhole measurement tools and sensors and LWD and MWD elements, including a resistivity logging tool 26. The resistivity logging tool 26 may comprise a plurality of antennas capable of receiving and/or transmitting one or more EM signals that are axially spaced along the length of the tool 26. As will be described in detail below, the resistivity logging tool 26 may further comprise at least one ferrite elements that is proximate and tilted with respect to at least one of the antennas, which may increase the azimuthal sensitivity of the antenna and tool 26.

As the bit extends the borehole 16 through the formations 18, the resistivity logging tool 26 may collect azimuthally sensitive measurements relating to the resistivity of the formation 104, i.e., how strongly the formation 104 opposes a flow of electric current. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments. In embodiments including an azimuthal orientation indicator, the resistivity measurements may be associated with a particular azimuthal orientation.

In certain embodiments, the resistivity logging tool 26 may also include a control unit (not shown) coupled to the transmitters and receivers that controls their operation, stores measurements, and in certain instances processes the measurements to determine the resistivity of the formation. Example control units may include microcontrollers and microcomputers and any other device that contains at least one processor communicably coupled to memory devices containing a set of instructions that when executed by the processor, cause it to perform certain actions. In certain embodiments, a control unit of the resistivity logging tool 26 may be communicably coupled to other controllers within the BHA.

The BHA may also include a steering tool 34 that controls the direction of the drill bit 14 and, therefore, the direction in which the borehole 16 will be drilled. Example steering tools include point-the-bit and push-the-bit type systems. One use of the steering tool 34 is to direct the drill bit 14 and borehole 16 to one of the formation strata 18a-c that contains hydrocarbons. Other uses include avoiding certain undesired strata or formation bodies, following existing borehole, or intersecting existing borehole to drill relief wells in the case of a blowout. In certain embodiments, the steering tool 34 may include a separate control unit (not shown) that controls the operation of the steering tool 34. The control unit may be communicably coupled to other controllers within the BHA, such as a control unit within the resistivity logging tool 26, and may alter its operation depending on measurements or signals received from the other controllers.

The tools and sensors of the BHA may be communicably coupled to a telemetry element 28. The telemetry element 28 may itself include a control unit (not shown) and may transfer measurements and signals from the resistivity logging tool 26 and steering tool 34 to a surface receiver 30 and/or to receive commands from the surface receiver 30. The telemetry element 28 may comprise a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the resistivity logging tool 26 may also be stored within the tool 26 or the telemetry element 28 for later retrieval at the surface 102.

In certain embodiments, the drilling system 100 may comprise surface control unit 32 positioned at the surface 102. In certain embodiments, the surface control unit 32 may provide additional functionality not available at the control units within the borehole 16, such as a keyboard and monitor that allow a user at the surface to interact with the surface control unit 32. The surface control unit 32 may be communicably coupled to the surface receiver 30 and may receive measurements and signals from the resistivity logging tool 26 and steering tool 34 and/or transmit commands to the resistivity logging tool 26 and steering tool 34 though the surface receiver 30. The surface control unit 32 may also receive measurements and signals from the resistivity logging tool 26 and steering tool 34 when the tool 26 is retrieved at the surface 102. Notably, the measurements from the resistivity logging tool 26 may be processed using only control units within the BHA, using only surface control unit 32, or using some combination of the surface control unit 32 and control units within the BHA. Similarly, the operation of the steering tool 34 may be controlled using only control units within the BHA, using only surface control unit 32, or using some combination of the surface control unit 32 and control units within the BHA.

Figure 2:
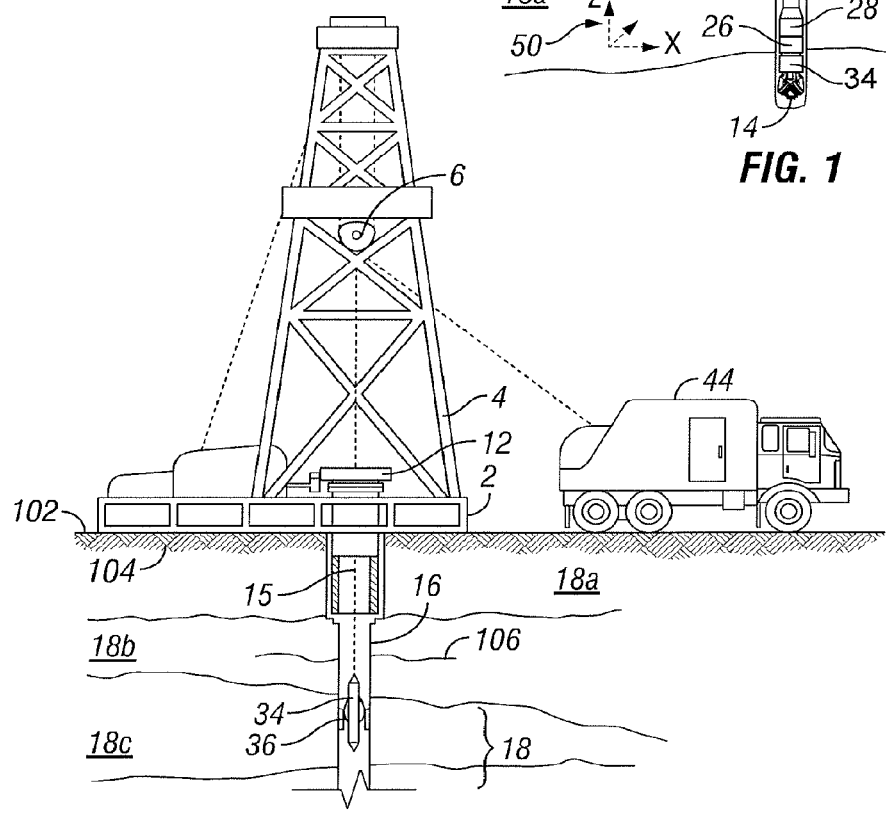
FIG. 2 is a diagram showing an illustrative wireline logging environment, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may include a resistivity logging tool 36 having at least one antenna and ferrite element similar those described above in relation to the resistivity logging tool 26. The resistivity logging tool 36 may be communicatively coupled to the cable 15. A logging facility 44 (shown in FIG. 2 as a truck, although it may be any other structure) may collect measurements from the resistivity logging tool 36, and may include computing facilities (including, e.g., a control unit) for controlling, processing, storing, and/or visualizing the measurements gathered by the resistivity logging tool 36. The computing facilities may be communicatively coupled to the logging/measurement tool 36 by way of the cable 15. In certain embodiments, the surface control unit 32 may serve as the computing facilities of the logging facility 44.

As described above, FIGS. 1 and 2 show a formation 104 with one or more rock strata or layers 18a-c. Each of the strata 18a-c may have different physical and electrical characteristics. For example, some of the strata may be generally conductive while others may be generally resistive. Resistivity logging tools 26 and 36 may generate measurements of the formation 104 that allow the resistivity of the strata 18a-c to be determined and models or images of the formation 104 to be built, including models that identify the location and type of each strata 18a-c. The antennas and corresponding tilted ferrite elements of the resistivity logging tools 26 and 36 may take azimuthally sensitive measurements that provide angular resolution around the borehole 16. Advantageously, the antennas and corresponding tilted ferrite elements may provide the azimuthally sensitive measurements while occupying less axial space on a tool than a typical tilted antenna that provides similar measurements. This may allow more flexibility regarding the placement of the antennas and logging tools within the BHA. One location of particular interest is near the drill bit 14, where azimuthally sensitive measurements may be taken ahead of the drill bit 14 to allow for steering decisions to be made and control signals generated in real or near real time.

Figure 3:
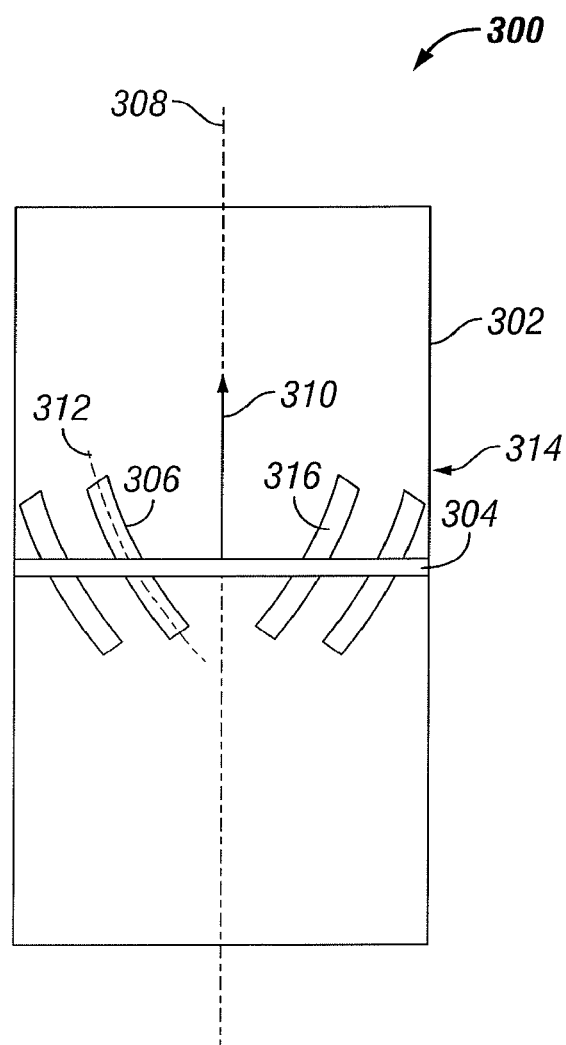
FIG. 3 is a diagram of an example resistivity logging tool, according to aspects of the present disclosure.

FIG. 3 is a diagram of an example resistivity logging tool 300 with an antenna and at least one ferrite element proximate and tilted with respect to the antenna, according to aspects of the present disclosure. Specifically, the tool 300 comprises a tool body 302, an antenna 304 coupled to the tool body 302, and a ferrite element 306 coupled to the tool body 302 and proximate at least a portion of and tilted with respect to the antenna 304. The antenna 304 may comprise a loop antenna, an antenna coil, or any other antenna capable of transmitting or receiving an electromagnetic field. In the embodiment shown, the antenna 304 may define a plane with a normal 310. The ferrite element 306 may comprise any iron or iron alloy, and may be considered tilted with respect to the antenna 304 if it is a non-parallel orientation with respect to the normal 310 of the antenna 304. The ferrite element 306 may be characterized by the extent it is angularly offset from the normal 310. In the embodiment shown, the ferrite element 306 comprises a bar shape with a longitudinal axis 316 that is angularly offset from the normal 310. Although the bar shape of the ferrite element 306 shown in FIG. 3 may be useful to orient the ferrite element 306 with respect to the antenna 304, other shapes are possible.

The tool body 302 may comprise an elongated, unitary tubular structure or an elongated, tubular structure with one or more segments of different types. For example, the tool body 302 may comprise a unitary mandrel within the BHA, above the BHA, or a segmented mandrel in different portions of a drilling assembly. Both the antenna 304 and ferrite element many be coupled to or proximate an outer surface of the tool body 302. For example, the ferrite element 306 may be coupled to an outer surface of the tool body 302, or secured within machined grooves or notches within the tool body 302 that open at the outer surface of the tool body 302. In other embodiments, the ferrite element 306 may be integrated within the tool body 302. Similarly, the antenna 304 may be coupled to an outer surface of the tool body 302 or secured within a groove at an outer surface of the tool body 302.

In the embodiment shown, the tool body 302 is characterized by a longitudinal axis 308, and the ferrite element 306 and antenna 304 are at least partially proximate to each other and co-located at a common axial location along the tool body. Specifically, the ferrite element 306 is coupled to the tool body 302, and the antenna 304 is wrapped around the outer surface of the tool body 302. Notably, at least a portion of the antenna 304 may overlap at least a portion of the ferrite element 306 at the common axial location, such that the ferrite element 306 is at least partially within an inner area defined by the antenna 304.

In certain embodiments, the antenna 304 may be characterized by a tilt angle that corresponds to the angular difference between the normal 310 of the antenna 304 and the longitudinal axis 308. If the normal 310 of the antenna 304 is parallel with the longitudinal axis 308 of the tool body 302, as it is in FIG. 3, the tilt angle of the antenna 304 is 0° and the antenna 304 is not tilted with respect to the tool body 302. In contrast, if the normal 310 of the antenna 304 is not parallel with the longitudinal axis 308 of the tool body 302, the antenna 304 will have a tilt angle with an absolute value of greater than 0° and, therefore, is tilted with respect to the tool body 302. Generally speaking, the azimuthal sensitivity of an antenna increases as the tilt angle increases, with non-tilted antennas providing no azimuthal sensitivity. An increase in the tilt angle of an antenna, however, also corresponds with an increase in the axial space occupied by the antenna. As will be described in greater detail below, tilted ferrite elements may be used with antennas of any tilt angle to effectively change the tilt angle and azimuthal sensitivity of the antenna by altering the EM field distribution around the antenna. Notably, this allows for the tilt angle to be effectively increased without a corresponding increase in the axial space occupied by the antenna.

In the embodiment shown, the ferrite element 306 is one of a plurality of ferrite elements 314 positioned around the outer surface of the tool body 302, all of which may individually and collectively affect the EM field distribution around the antenna 304. The plurality of ferrite elements 314 may be equally spaced around the outer surface of the tool body 302 or may be bunched at particular angular orientations. The plurality of ferrite elements 314 comprises an other ferrite element 316 that is located at a common axial location on the tool 302 as the ferrite element 306 and is also tilted with respect to the antenna 304, but which has a different angular orientation than the ferrite element 306. Specifically, the other ferrite element 316 is tilted in an opposite direction than the ferrite element 306, but with the same absolute angular orientation. In other embodiments, the ferrite element 306 and other ferrite element 316 may have different absolute angular orientations with respect to the normal 310 and antenna 304. In yet other embodiments, all ferrite elements of the plurality of ferrite elements 314 may have the same angular orientations with respect to the normal 310 and antenna 304. In yet other embodiments, some or all of the ferrite elements 314 may comprise different axial location along the tool body. This may be particularly useful when the antenna 304 is physically tilted. For example, other ferrite element 316 may have a different axial orientation than the ferrite element 306, with the different axial orientations at least partially corresponding to the axial positions of the antenna 304 around the tool body 506. This may ensure, for example, that each of the plurality of ferrite elements 314 is at least partially proximate to and overlapped by the antenna 304.

In certain embodiments, the angular orientation the ferrite element 304 may be changed while the tool 300 is positioned downhole. The ferrite element 304, for example, may be connected to a swivel plate that is driven by an electric motor (not shown) within the tool 300. The electric motor may receive control signals from a control unit within the tool 300 that determines the correct angular orientation for a particular measurements, the correct angular orientation being based on the effective tilt angle of the antenna 304 caused by a particular angular orientation of the ferrite element 306, as will be described below. In other embodiments, all of the ferrite elements 314 may have angular orientations that can be controlled remotely to alter the effective tilt angle of the antenna 304.

Although only one antenna 304 is shown in FIG. 3, example resistivity logging tools could include multiple antennas, some or all of which are tilted, and some of which are transmitters and other receivers. Some or all of the antennas may include tilted ferrite elements, as described above. The orientations of the ferrite elements for each antenna are not required to be the same, however. For example, in certain embodiments, some or all of the antennas may correspond to ferrite elements with similar angular orientations. Yet in other embodiments, each of the antennas may correspond to ferrite elements with different angular orientations. In some embodiments, the angular orientations of the ferrite elements may depend on the relative differences between the amount each antenna is physically tilted.

The EM field distribution around the antenna 304 may be changed due to the electromagnetic properties of the ferrite element 306, in addition to the electromagnetic properties of the remaining plurality of ferrite elements 314 in embodiments where a plurality of ferrite elements is used. Specifically, the iron or iron alloy of the ferrite element 306 may be characterized by a directionally-oriented magnetic response that affects surrounding EM fields. Locating the ferrite element 306 within the EM field distribution of the antenna 304 and tilting the ferrite element 306 with respect to the antenna 304, therefore, may cause the EM field distribution of the antenna 304 to be altered.

Figure 4:
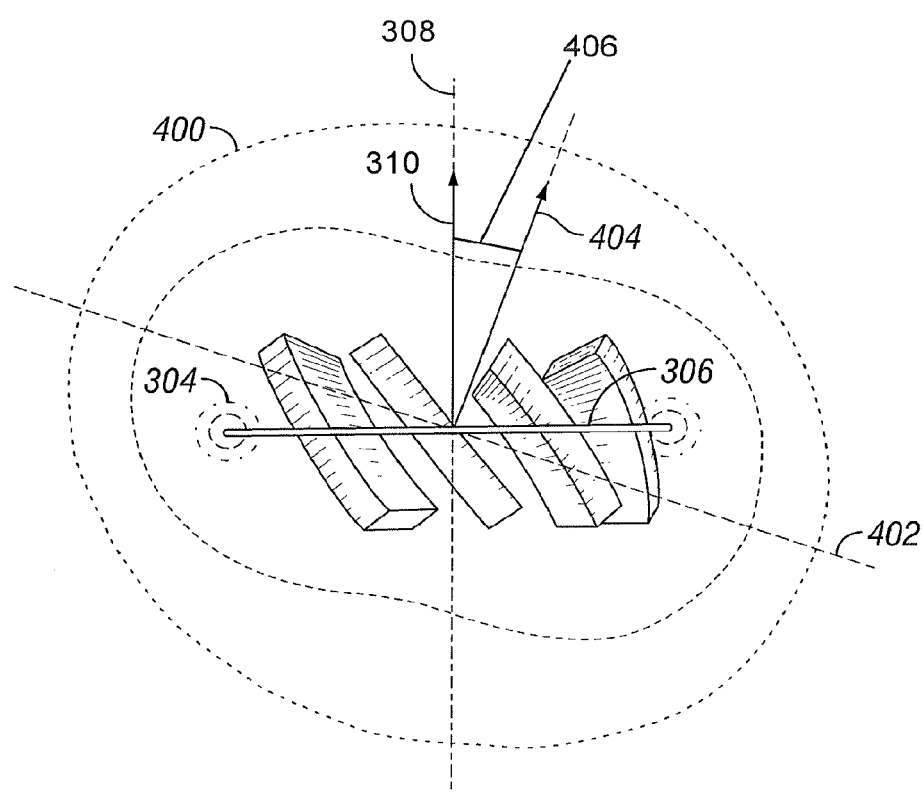
FIG. 4 is a diagram of an electromagnetic (EM) field distribution corresponding to an example antenna, according to aspects of the present disclosure.

FIG. 4 is a diagram illustrating an EM field distribution 400 for the antenna 304 and ferrite inert 306 orientation in FIG. 3. Typically, loop antennas or antenna coils include EM field distributions that are evenly spaced with respect to the plane defined by the antenna. The EM field distribution 400, in contrast, is spaced around a plane 402 with a normal 404 that is at an angular offset 406 from the normal 310 of the antenna 304. In other words, the EM field distribution 400 corresponds to an antenna with a tilt angle greater than the tilt angle of the antenna 304 by the angular offset 404. Accordingly, the tilt angle of the antenna 304 (0° in this embodiment) has been effectively increased by the angular offset 404 without a corresponding change in the actual angle of the antenna 304. When the antenna 304 is not tilted, as it is in FIG. 3, this increase may result in an effective tilt angle that provides for azimuthally sensitive measurements that were not previously available. This effect may be particularly advantageous where tilted ferrite elements can be used to retrofit logging tools with non-tilted antennas. Similarly, if the antenna 304 is tilted, the increase may result in an effective tilt angle greater than the actual tilt angle of the antenna, which may improve the azimuthal sensitivity of the antenna. Additionally, as will be described below, the effective increase may be used to design a tilted antenna with an equivalent azimuthal sensitivity yet smaller tilt angle and space requirement than a typical tilted antenna.

Figure 5:
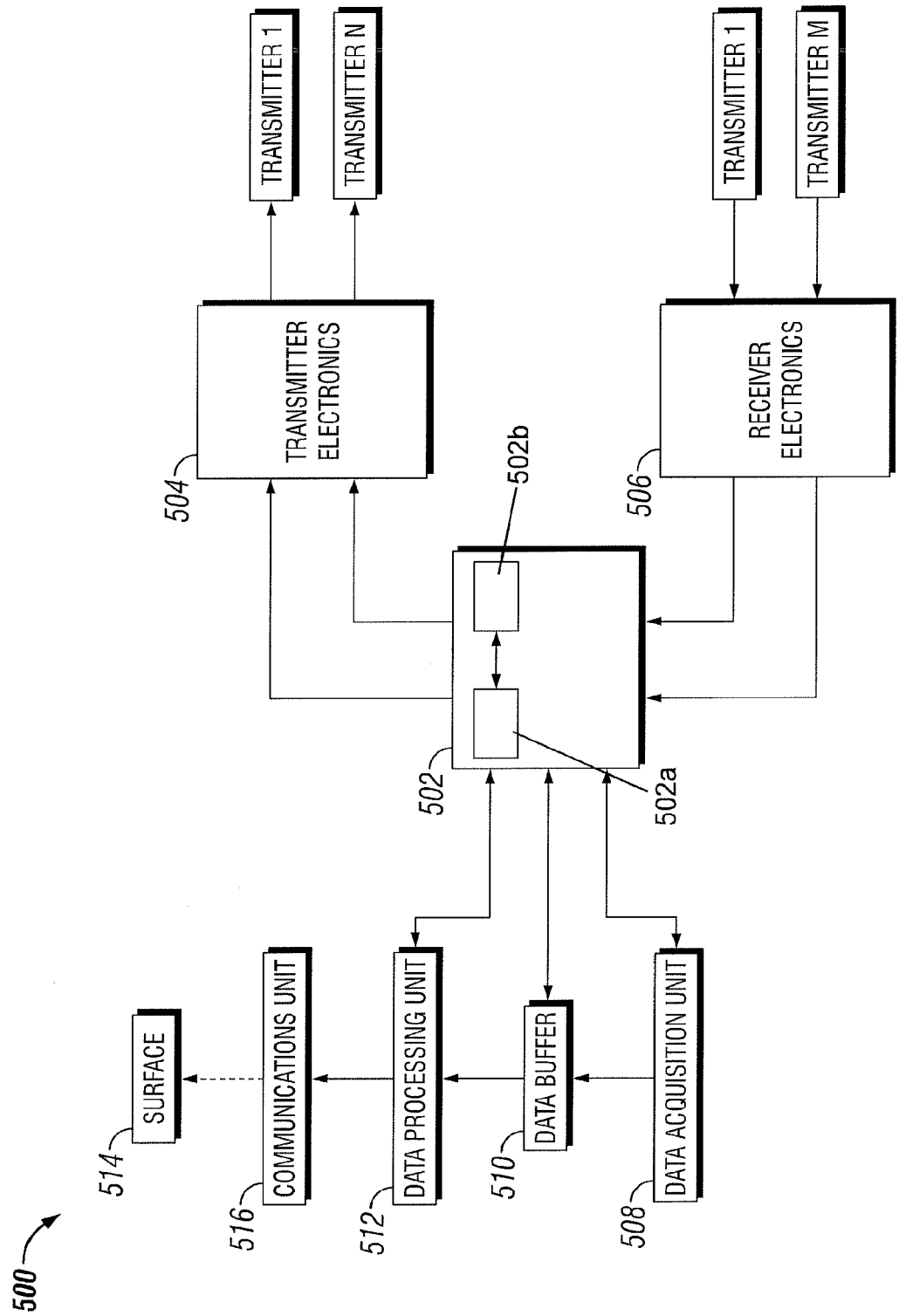
FIG. 5 is a diagram of an example control system for a resistivity logging tool, according to aspects of the present disclosure.

FIG. 5 is a diagram of an example control system 500 for a resistivity logging tool, according to aspects of the present disclosure. The system 500 comprises a control unit 502, similar to the control units described above, that may function as the primary control unit for the tool. The control unit 502 may include processor 502a. Processor 502a may include, for example a microprocessor, microcontroller, digital signal processor (DSP), application specific integrated circuit (ASIC), or any other digital or analog circuitry configured to interpret and/or execute program instructions and/or process data. In some embodiments, processor 502a may be communicatively coupled to memory 502b. Processor 502a may be configured to interpret and/or execute program instructions and/or data stored in memory 502b. Program instructions or data may constitute portions of software for carrying out the control of a wellbore logging tool, processing measurements received at the tool, and transmitting the processed measurements to the surface or to another downhole control unit. Memory 502b may comprise non-transitory computer readable media that may include any system, device, or apparatus configured to hold and/or house one or more memory modules; for example, memory 502b may include read-only memory, random access memory, solid state memory, or disk-based memory. Each memory module may include any system, device or apparatus configured to retain program instructions and/or data for a period of time (e.g., computer-readable non-transitory media). As used herein, software, software components, or program instructions may comprise a set of instructions that, when executed by a processor, cause the processor to perform certain actions. According to aspects of the present disclosure, the actions may be performed with respect to measurements from a resistivity logging tool to identify and characterize fractures within a formation.

In certain embodiments, the control unit 502 may be communicably coupled to transmitters 1-N through transmitter electronics 504 and communicably coupled to receivers 1-M through receiver electronics 506. The transmitters 1-N and receivers 1-M may comprise loop or coil antennas with tilted ferrite elements, similar to those described above. The transmitter electronics 504 and receiver electronics 506 may comprise circuit boards to which some or all of the transmitters 1-N and receivers 1-M are coupled. The control unit 502 may trigger the transmitter electronics 504 to generate a time-varying electromagnetic (EM) signal through one or more of the transmitters 1-N. The time-varying EM signal may be a sinusoidal signal, its phase, amplitude, and frequency set at a desired value. In certain embodiment, the control unit 502 may cause one transmitter to transmit multiple time-varying EM signals, each with a different phase, amplitude, and/or frequency. In certain embodiments, the control unit 502 may cause each of the transmitters 1-N to transmit a different time-varying EM signal, with different phases, amplitudes, and/or frequencies. Other transmission schemes are possible, as would be appreciated by one of ordinary skill in the art in view of this disclosure.

The time-varying EM signals generated by one or more of the transmitters 1-N may excite the formation surrounding the tool, and one or more of the receivers 1-M may measure the response of the formation to the time-varying EM signals. In certain embodiments, one or more of the receivers 1-M may be tuned to measure a response within a frequency band containing the transmitted time-varying EM signal. The control unit 502 may receive the measured responses from the receivers 1-M through the receiver electronics 506 and may transmit the measured responses to the data acquisition unit 508. For a specific transmitter excitation, measured responses from multiple receivers can be received at the same time. Similarly, multiple transmitters 1-N can be excited at the same time and they can be time, frequency or jointly multiplexed for latter demultiplexing operation at the receivers. Upon reception at the data acquisition unit 508, the measured responses may be digitized, stored in a data buffer 510, processed at data processing unit 512, and sent to the surface 514 through a communication unit 516, which may comprise a downhole telemetry system.

In certain embodiments, the responses from the receivers 1-M may be measured with respect to the signals from the transmitters 1-N that generated the responses. In certain embodiments, this may include comparing the measured responses to the transmitters signals. The comparison may be made, for example, downhole in the data processing unit 512, or at an information handling system at the surface. When the comparison is made downhole, the system control unit 502 may communicate the phase, amplitude, and frequency of the transmitted time-varying EM signals to the data processing unit 512, which may compare the time-varying EM signals to the measured responses from the receivers 1-M. In certain embodiments, the data processing unit 512 may determine the phase and amplitude of the measured responses, and compare the determined phase and amplitude of the measured responses to the phase and amplitude of the corresponding transmitted time-varying EM signal. Accordingly, the amplitude of the measured response may comprise an amplitude ratio or amplitude difference with respect to the transmitted time-varying EM signal, and the phase of the measured response may comprise a phase shift or difference with respect to the transmitted time-varying EM signal.

Resistivity logging tools similar to those described above may be azimuthally sensitive based on the azimuthal orientation of the actually and/or effectively tilted antennas. At a given time, the azimuthal direction in which the tool is directed may be referred to as the tool face angle. The tool face angle may be identified, for example, using orientation sensors described above. When a resistivity logging tool is placed within a borehole and rotated (e.g., during drilling operations in a LWD/MWD configuration), azimuthally sensitive measured responses of the formation surrounding the tool may be made, with the azimuthal direction of each measured response being associated with the tool face angle of the logging tool when the response was measured. If the tool is rotated at one depth, for example, measured responses along 360 degrees of rotation may be collected. In certain embodiment, the measured responses may be associated with particular azimuthal directions based, at least in part, on the tool face angle of the tool at the time the measurement was collected. The measurements may then be processed to determine discrete resistivity values along the 360 degrees surrounding the tool.

Figure 6:
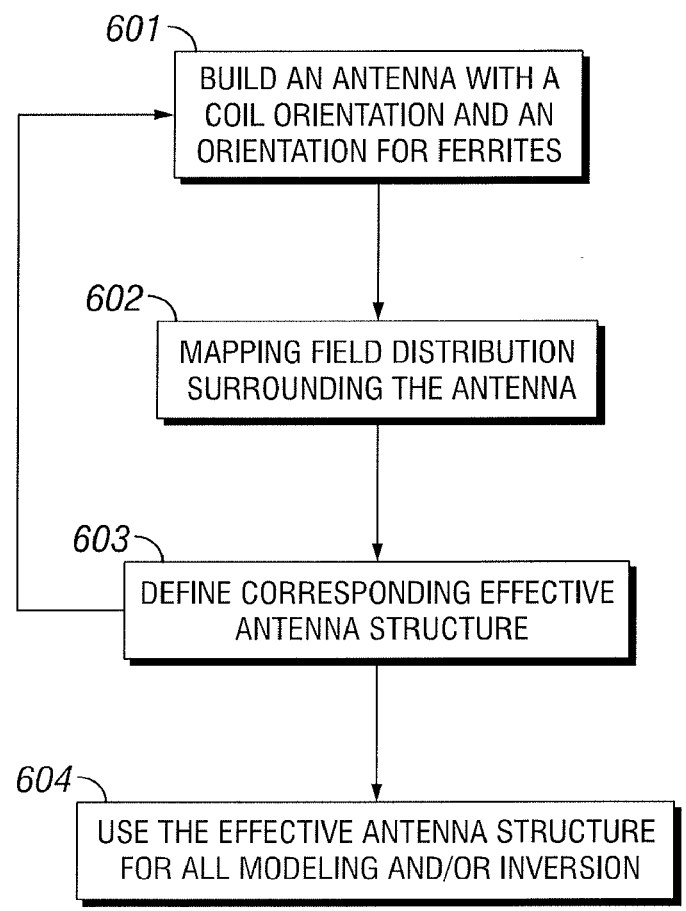
FIG. 6 is a flow diagram corresponding to an example method, according to aspects of the present disclosure.

As described above, the use of tilted ferrite elements may allow for the design of a tilted antenna with an equivalent azimuthal sensitivity yet smaller tilt angle and space requirement than a typical tilted antenna. FIG. 6 illustrates an example process for designing an antenna with an effective tilt angle and processing resulting measurements using the designed tilt angle. Step 601 comprises building an antenna with a first tilt angle and a first angular orientation for the tilted ferrite element. After the antenna has been built, the EM field distribution surrounding the antenna may be mapped at step 602. Mapping the EM field distribution may comprise using a device with triaxial sensors to measure the EM field distribution surrounding the antenna. Once the EM field distribution has been mapped, the effective tilt angle of the antenna can be determined at step 603. If the effective tilt angle is the desired tilt angle, then the process may move to step 604. For example, if an antenna with a 45 degree tilt angle is required for the tool, and step 601 produced an antenna with a 17 degree actual tilt as well as tilted ferrite elements underneath the antenna to acquire an effective tilt angle of 45 degrees, then the process may move to step 604. If not, the antenna and ferrite element may be modified until the appropriate tilt angle is achieved. Step 604 may comprise incorporating the effective structure of the antenna into future calculations for the tool. For example, the effective tilt angle of the antenna may be used when determining resistivity values from measurements collected by the tool, as well as when the resistivity values or measurements are otherwise used in a modeling or inversion process to determine characteristics about the formation.

According to aspects of the present disclosure, an example logging tool may comprise a tool body characterized by a longitudinal axis and an antenna coupled to the tool body. The logging tool may further comprise a ferrite element coupled to the tool body proximate at least a portion of the antenna and in a non-parallel orientation with respect to a normal of a plane defined by the antenna. In certain embodiments, the antenna comprises one of a tilted and a non-tilted angle with respect to the longitudinal axis of the tool body. In certain embodiments, the logging tool may further comprise a control unit communicably coupled to the antenna, the control unit comprising a processor and a non-transitory computer readable medium communicably coupled to the processor that contains a set of instruction that, when executed by the processor, cause the processor to receive an output from the antenna; and determine a formation characteristic based, at least in part, on the received output, the determined resistivity value associated with an azimuthal orientation. In certain embodiments, the antenna comprises an effective antenna angle different from an actual antenna angle, the effective antenna angle based, at least in part, on the non-parallel orientation of the ferrite element with respect to the antenna.

In any of the embodiments described in the preceding paragraph, the ferrite element may comprise a non-parallel orientation with respect to the longitudinal axis of the tool body. In any of the embodiments described in the preceding paragraph, the logging tool may further comprise an other ferrite element spaced apart from the ferrite element with respect to an outer diameter of the tool body. The other ferrite element may comprise at least one of a different orientation than the ferrite element with respect to the normal of the plane defined by the antenna, and a different axial location along the tool body than the ferrite element. In any of the embodiments described in the preceding paragraph, the logging tool may further comprise a second antenna coupled to the tool body; and a second ferrite element coupled to the tool body proximate at least a portion of the second antenna and in a non-perpendicular arrangement with respect to a normal of a plane defined by the second antenna. In any of the embodiments described in the preceding paragraph, the orientation of the ferrite element may be adjustable with respect to the normal of the antenna.

In certain embodiments, the orientation of the second ferrite element may be adjustable with respect to the normal of the second antenna.

According to aspects of the present disclosure, an example method comprises positioning a logging tool within a subterranean formation and generating an electromagnetic signal from a first antenna coupled to a logging tool. The method may further comprise measuring a response of the formation to the electromagnetic signal at a second antenna coupled to the logging tool, wherein at least one of the first antenna and the second antenna comprises an effective tilt angle with respect to the logging tool that differs from its actual tilt angle with respect to the logging tool. In certain embodiments, both the first antenna and the second antenna comprise effective tilt angles with respect to the logging tool that differ from their actual tilt angles with respect to the logging tool. In certain embodiments, at least one of the first antenna and the second antenna has an actual tilt angle of zero degrees.

In any of the embodiments described in the preceding paragraph, generating the electromagnetic signal from the first antenna may comprise generating the electromagnetic signal from the first antenna at least partially proximate to a ferrite element coupled to the tool body and in a non-parallel orientation with respect to a normal of a plane defined by the first antenna. In any of the embodiments described in the preceding paragraph, measuring the response at the second antenna may comprise measuring the response at the second antenna at least partially proximate to a ferrite element coupled to the tool body and in a non-parallel orientation with respect to a normal of a plane defined by the second antenna. In any of the embodiments described in the preceding paragraph, the method may further comprise altering an effective tilt angle of at least one of the first antenna and the second antenna while the logging tool is within the borehole. In certain embodiments, altering an effective tilt angle of at least one of the first antenna and the second antenna may comprise changing an angular orientation between of at least one of the first antenna and the second antenna and a ferrite element coupled to the tool body and positioned at least partially proximate to at least one of the first antenna and the second antenna.

In any of the embodiments described in the preceding two paragraphs, the method may further comprise determining a characteristic of the formation based, at least in part, on the measured response. The characteristic may comprise resistivity values of the formation corresponding to azimuthal orientations. The method may also include generating a command to a steering system coupled to the logging tool based, at least in part, on the determined characteristic.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A logging tool, comprising:
   a tool body characterized by a longitudinal axis;
   an antenna coupled to the tool body; and
   a ferrite element coupled to the tool body proximate at least a portion of the antenna and in a non-parallel orientation with respect to a normal of a plane defined by the antenna; and
   a swivel plate coupled to the ferrite element, wherein the swivel plate positions the ferrite element at an angular orientation with respect to the antenna to alter an effective tilt angle of the antenna.

2. The logging tool of claim 1, wherein the antenna comprises one of a tilted and a non-tilted angle with respect to the longitudinal axis of the tool body.

3. The logging tool of claim 1, further comprising a control unit communicably coupled to the antenna, the control unit comprising a processor and a non-transitory computer readable medium communicably coupled to the processor that contains a set of instruction that, when executed by the processor, cause the processor to:
   receive an output from the antenna; and
   determine a formation characteristic based, at least in part, on the received output, the determined resistivity value associated with an azimuthal orientation.

4. The logging tool of claim 3, wherein the effective antenna angle is different from an actual antenna angle, the effective antenna angle based, at least in part, on the non-parallel orientation of the ferrite element with respect to the antenna.

5. The logging tool of claim 1, wherein the ferrite element comprises a non-parallel orientation with respect to the longitudinal axis of the tool body.

6. The logging tool of claim 1, further comprising an other ferrite element spaced apart from the ferrite element with respect to an outer diameter of the tool body.

7. The logging tool of claim 6, wherein the other ferrite element comprises at least one of
   a different orientation than the ferrite element with respect to the normal of the plane defined by the antenna, and
   a different axial location along the tool body than the ferrite element.

8. The logging tool of claim 1 further comprising
   a second antenna coupled to the tool body; and
   a second ferrite element coupled to the tool body proximate at least a portion of the second antenna and in a non-perpendicular arrangement with respect to a normal of a plane defined by the second antenna.

9. The logging tool of claim 1, wherein an orientation of the ferrite element is adjustable with respect to the normal of the antenna.

10. The logging tool of claim 8, wherein an orientation of the second ferrite element is adjustable with respect to the normal of the second antenna.

11. A method comprising,
    positioning a logging tool within a subterranean formation;
    generating an electromagnetic signal from a first antenna coupled to a logging tool;
    positioning a first ferrite element coupled to the tool body proximate at least a portion of the first antenna via a swivel plate, wherein positioning the first ferrite element comprises positioning the first ferrite element at an angular orientation with respect to the first antenna to alter a first effective tilt angle of the first antenna; and
    measuring a response of the formation to the electromagnetic signal at a second antenna coupled to the logging tool, wherein the first effective tilt angle differs from a first actual tilt angle of the first antenna with respect to the logging tool.

12. The method of claim 11, wherein the second antenna comprises a second effective tilt angles with respect to the logging tool that differs from a second actual tilt angles of the second antenna with respect to the logging tool.

13. The method of claim 12, wherein at least one of the first actual tilt angle of the first antenna and the second actual tilt angle of the second antenna is zero degrees.

14. The method of claim 11, wherein generating the electromagnetic signal from the first antenna comprises generating the electromagnetic signal from the first antenna at least partially proximate to the first ferrite element coupled to the tool body and in a non-parallel orientation with respect to a normal of a plane defined by the first antenna.

15. The method of claim 11, wherein measuring the response at the second antenna comprises measuring the response at the second antenna at least partially proximate to a second ferrite element coupled to the tool body and in a non-parallel orientation with respect to a normal of a plane defined by the second antenna.

16. The method of claim 11, further comprising altering at least one of the first effective tilt angle of the first antenna and a second effective tilt angle of the second antenna while the logging tool is within the borehole.

17. The method of claim 16, wherein altering at least one of the first effective tilt angle of the first antenna and the second effective tilt angle of the second antenna comprises changing an angular orientation between of at least one of the first antenna and the second antenna and at least one of the first ferrite element and the second ferrite element.

18. The method of claim 11, further comprising determining a characteristic of the formation based, at least in part, on the measured response.

19. The method of claim 18, wherein the characteristic comprises resistivity values of the formation corresponding to azimuthal orientations.

20. The method of claim 19, further comprising generating a command to a steering system coupled to the logging tool based, at least in part, on the determined characteristic.

* * * * *